A. PAUL.
VALVE.
APPLICATION FILED FEB. 18, 1908.
927,161. Patented July 6, 1909.
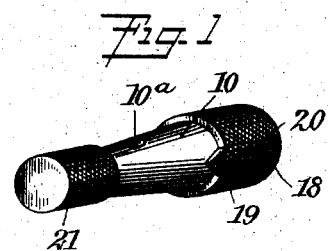
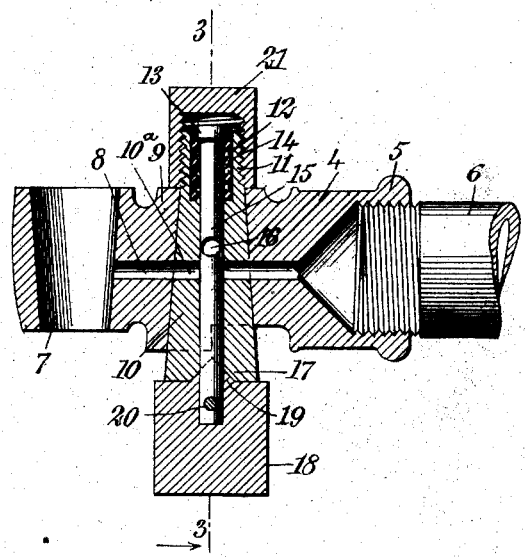
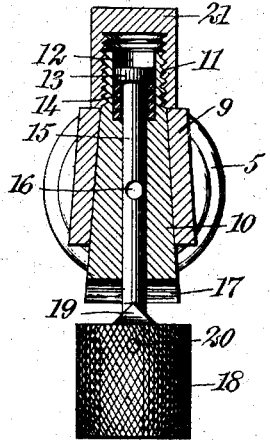
WITNESSES
E. G. Bromley
Walton Harrison
INVENTOR
Adolf Paul
BY Munn & Co.
ATTORNEYS

UNITED STATES PATENT OFFICE.

ADOLF PAUL, OF NEW YORK, N. Y., ASSIGNOR OF ONE-HALF TO ALFRED E. LATHAM, OF BROOKLYN, NEW YORK.

VALVE.

No. 927,161.      Specification of Letters Patent.      Patented July 6, 1909.

Application filed February 18, 1908. Serial No. 416,461.

*To all whom it may concern:*

Be it known that I, ADOLF PAUL, a citizen of the United States, and a resident of the city of New York, borough of Brooklyn, in the county of Kings and State of New York, have invented a new and Improved Valve, of which the following is a full, clear, and exact description.

My invention relates to valves, my more particular object being to produce an efficient type of valve suitable for use in connection with liquids or gases, and especially adapted for handling illuminating gas.

My invention further comprises certain details of construction whereby the closure of the valve is rendered positive and the general efficiency of the valve is greatly increased, while the construction is at the same time simplified.

Reference is to be had to the accompanying drawings forming a part of this specification, in which similar characters of reference indicate corresponding parts in all the figures.

Figure 1 is a perspective showing the valve plug removed from the valve, this valve plug being a composite structure consisting of several parts movable under certain conditions relatively to each other; Fig. 2 is an enlarged central vertical section through the valve complete, showing the construction of the composite valve plug which is normally stationary within the casing and is provided with a revoluble stem having an aperture adapted to register with apertures in the valve casing, the plug being further provided with a spring normally tending to force the revoluble stem into a predetermined position; and Fig. 3 is a central vertical section upon the line 3—3 of Fig. 2, looking in the direction of the arrow and showing the revoluble stem, the milled head for actuating the same, and the spiral spring occupying the positions appertaining to them when the stem is being turned for the purpose of opening or closing the valve.

A casing 4 is provided with a portion 5 threaded internally, and fitting into this portion is a pipe 6 threaded externally for the purpose. The casing 4 is further provided with an aperture 7 of frusto-conical form used for receiving a pipe through which the gas, or other fluid, is to flow. The casing 4 is provided with a hole 8 and is also provided with a central portion 9 through which extends a sleeve 10 of frusto-conical form. This sleeve is provided with a threaded portion 11 having a recess 12. Slidably mounted within this recess is a head 13, and engaging this head is a spiral spring 14 disposed within the recess 12. The head 13 is mounted rigidly upon a revoluble stem 15 which is provided with a hole 16 adapted to register with a hole 10ª in the sleeve 10, this hole last mentioned being in registry with the hole 8 whenever the sleeve 10 is in position, this sleeve being stationary in relation to the casing. The sleeve 10 is entirely separate from the casing 4, as will be understood from Fig. 1, and is provided with notches 17 disposed upon opposite sides of the stem 15. A milled head 18 is mounted rigidly upon the stem 15 and is used for turning the same by hand. Mounted upon the milled head 18 are detents 19 mating the notches 17 and adapted to fit neatly thereinto. The milled head 18 is connected with the stem 15 by aid of a pin 20. A cap 21 is threaded internally and is fitted upon the threaded portion 11 of the sleeve 10 and adapted to jam against the portion 9 of the casing.

The operation of my device is as follows: When the valve is closed, the parts occupy the positions indicated in Fig. 2; when open, the positions indicated in Fig. 3. When the valve is closed, as in Fig. 2, the spring 14 is expanded to its limit, and the detents 19 are lodged within the notches 17 so that the milled head 18 abuts directly against the larger end of the sleeve 10. The tension of the spring 14 against the head 13 causes the detents 19 to hug securely within the notches 17 in such manner that neither the stem 15 nor the milled head 18 for actuating the same are likely to become accidentally displaced. If, however, the milled head 18 be grasped by the fingers and turned, the detents 19 ride out of the notches 17 and draw the stem 15 in the general longitudinal direction of its axis, thereby compressing the spring 14.

If the detents 19 are well out of the notches 17, there is nothing to prevent further rotation of the milled head 18, and the latter is therefore easily turned until it reaches such position that the hole 16 is wholly or partially in alinement with the holes 10ª and 8. The valve is thus opened to any desired extent, and while thus open the tension of the spring 14 is greatest. This insures that the sleeve 10 and the stem 15 are held firmly in the position in which they are placed. When the valve is open, the detents 19, being beveled and having an angular surface, are forced hard against the smooth abutting end of the sleeve 10. When the valve is closed, the spring 14 relaxes, as indicated in Fig. 2, but when this occurs the detents 19 occupy the notches 17 and are not easily removed therefrom. Therefore, when the valve is either open or closed, it will remain so until purposely disturbed by the operator. It will also be noted that when the valve is closed, as in Fig. 2, the hole 16 is not only out of alinement with the hole 8 in the sense that it is turned crosswise thereof, but it is out of alinement also in the sense that owing to the longitudinal movement of the stem 15 under tension of the spring 14, the hole 16 is displaced and moved completely out of its plane of rotation when opened. Such being the case the closure of the hole 10$^a$ is rendered very thorough for the simple reason that the member used for closing it is the solid part of the stem 15, as will be understood from Fig. 2. The entire plug, consisting of the sleeve 10, milled head 18, stem 15, spring 14 and head 13, may, as a unit, be moved from the casing. To accomplish this purpose the screw cap 21 is taken off and the sleeve 10 and its accompanying parts are slipped out endwise.

With the construction above described, the parts are easily replaced when worn out or broken and each part is easily fitted and readily accessible.

Having thus described my invention, I claim as new and desire to secure by Letters Patent:

In a valve, the combination of a casing, a sleeve extending therethrough, a stem extending through said casing and provided with a hole disposed diametrically in relation to said stem, said stem being further provided with a head integral with it, a milled head connected with said stem at the end thereof opposite said first-mentioned head, said milled head being provided with detents, and said sleeve being provided with notches for receiving said detents, and a spring engaging said first-mentioned head and also engaging said sleeve for the purpose of moving said stem in the general direction of its length relatively to said sleeve.

In testimony whereof I have signed my name to this specification in the presence of two subscribing witnesses.

ADOLF PAUL.

Witnesses:
WALTON HARRISON,
EVERARD B. MARSHALL.